United States Patent
Li et al.

(10) Patent No.: US 10,125,247 B2
(45) Date of Patent: Nov. 13, 2018

(54) POLYETHYLENE COMPOSITIONS

(71) Applicant: ExxonMobil Chemical Patents Inc., Baytown, TX (US)

(72) Inventors: Wen Li, Houston, TX (US); Adriana S. Silva, Houston, TX (US); Jianya Cheng, Kingwood, TX (US); Periagaram S. Ravishankar, Kingwood, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/472,981

(22) Filed: Mar. 29, 2017

(65) Prior Publication Data

US 2017/0198124 A1    Jul. 13, 2017

Related U.S. Application Data

(63) Continuation-in-part of application No. 15/303,788, filed as application No. PCT/US2015/030838 on May 14, 2015.

(60) Provisional application No. 62/004,278, filed on May 29, 2014, provisional application No. 62/117,514, filed on Feb. 18, 2015.

(30) Foreign Application Priority Data

Apr. 8, 2015  (EP) .................................... 15162711

(51) Int. Cl.
| | | |
|---|---|---|
| C08L 23/00 | (2006.01) | |
| C08L 23/08 | (2006.01) | |
| C08J 5/18 | (2006.01) | |

(52) U.S. Cl.
CPC ............. C08L 23/0815 (2013.01); C08J 5/18 (2013.01); *C08J 2323/08* (2013.01); *C08J 2423/20* (2013.01); *C08J 2423/24* (2013.01); *C08L 2203/16* (2013.01)

(58) Field of Classification Search
CPC .. C08L 23/0815; C08L 23/08; C08L 2203/16; C08L 45/00; C08L 23/06; C08J 5/18; C08J 2323/08; C08J 2423/08
See application file for complete search history.

(56) References Cited

U.S. PATENT DOCUMENTS

| | | |
|---|---|---|
| 3,568,252 A | 3/1971 | Masuda et al. |
| 3,592,881 A | 7/1971 | Ostapchenko |
| 3,891,790 A | 6/1975 | Kierstead |
| 4,032,600 A | 6/1977 | MacAdams et al. |
| 4,565,847 A | 1/1986 | Bahl et al. |
| 4,735,988 A * | 4/1988 | Takada et al. ......... C08L 23/12 524/504 |
| 4,784,885 A | 11/1988 | Carespodi |
| 5,670,595 A | 9/1997 | Meka et al. |
| 6,111,019 A | 8/2000 | Arjunan et al. |
| 6,114,457 A | 9/2000 | Markel et al. |
| 6,147,180 A | 11/2000 | Markel et al. |
| 6,187,869 B1 | 2/2001 | Gahleitner et al. |
| 6,300,451 B1 | 10/2001 | Mehta et al. |
| 6,355,757 B2 | 3/2002 | Garcia-Franco et al. |
| 6,391,998 B1 | 5/2002 | Garcia-Franco et al. |
| 6,417,281 B1 | 7/2002 | Garcia-Franco et al. |
| 6,509,431 B1 | 1/2003 | Duttweiler et al. |
| 6,734,265 B1 | 5/2004 | Dekmezian et al. |
| 6,870,010 B1 | 3/2005 | Lue et al. |
| 7,687,580 B2 | 3/2010 | Lohse et al. |
| 2004/0118592 A1* | 6/2004 | Pehlert ................ C08L 23/0815 174/110 R |
| 2005/0154136 A1 | 7/2005 | Dharia et al. |
| 2007/0260016 A1 | 11/2007 | Best et al. |
| 2008/0033112 A1 | 2/2008 | Squire et al. |
| 2008/0179780 A1 | 7/2008 | Broadus et al. |
| 2008/0258325 A1 | 10/2008 | Zimmermann |
| 2011/0042380 A1 | 2/2011 | Tsou et al. |
| 2013/0090433 A1 | 4/2013 | Jiang et al. |

FOREIGN PATENT DOCUMENTS

| | | |
|---|---|---|
| CN | 102863685 | 1/2013 |
| CN | 103937061 | 7/2014 |
| EP | 0 159 102 | 10/1985 |
| EP | 0 544 098 | 6/1993 |
| EP | 0999394 A | 5/2000 |
| EP | 1142703 A | 10/2001 |
| EP | 3101060 A | 12/2016 |
| GB | 1037819 A | 8/1966 |
| JP | 6-39918 | 2/1994 |
| JP | 6-136194 | 5/1994 |
| JP | 6-136197 | 5/1994 |
| JP | 06-143412 | 5/1994 |
| JP | 7-309983 | 11/1995 |
| JP | 2002-179855 | 6/2002 |

(Continued)

OTHER PUBLICATIONS

Guzman et al., "Simple Model to Predict Gel Formation in Olefin-Diene Copolymerizations Catalyzed by Constrained-Geometry Complexes," AIChE Journal, 2010, vol. 56, No. 5, pp. 1325-1333.

*Primary Examiner* — Nathan M Nutter

(74) *Attorney, Agent, or Firm* — Leandro Arechederra, III; Kevin M. Faulkner

(57) ABSTRACT

A polyethylene composition including the product of the combination of at least one copolymer made from units derived from at least 85 wt % ethylene and a $C_3$ to $C_{10}$ α-olefin and from 0.10 wt % to 10 wt % of a cyclic-diene terpolymer is provided.

21 Claims, 8 Drawing Sheets

(56) References Cited

FOREIGN PATENT DOCUMENTS

| | | |
|---|---|---|
| JP | 2011-218646 | 11/2011 |
| JP | 2011-231260 | 11/2011 |
| WO | 02/085954 | 10/2002 |
| WO | 2007/067307 | 6/2007 |
| WO | 2013/043796 | 3/2013 |
| WO | 2015/116382 A | 8/2015 |
| WO | 2016/205646 A | 12/2016 |

\* cited by examiner

POLYETHYLENE COMPOSITIONS

CROSS-REFERENCE TO RELATED APPLICATIONS

This application is a Continuation-in-Part of Ser. No. 15/303,788, filed Oct. 13, 2016, which is a National Stage Application of Application No. PCT/US2015/030838, filed May 14, 2015, that claims the benefit of Serial Nos. 62/004,278, filed May 29, 2014, 62/117,514, filed Feb. 18, 2015, and EP 15162711.1, filed Apr. 8, 2015, each of which is incorporated by reference in its entirety.

FIELD OF THE INVENTION

The present invention relates to polyethylene compositions made from the contact product of polyethylene copolymers and cyclic-diene terpolymers.

BACKGROUND OF THE INVENTION

The blown film technique is an important means by which polyethylene films are manufactured. A major use of such films is in making bags, where the films can be formed as continuous cylinders then crimped to close one end. The process to blow polyethylenes into such films however is complex, requiring a balance between processability (flowability and melt strength) on the one hand and mechanical properties (e.g., Tensile Strength, Modulus) on the other. Improvements in both the materials used to make such films, and the process itself, can synergistically make blown films a more attractive commercial product. The inventors here have found desirable materials and methods of forming blown films.

Methods of cooling films extruded through a ring die have been discussed in U.S. Pat. No. 3,891,790. Other references of interest include: U.S. Pat. No. 7,687,580; U.S. Pat. No. 6,509,431; U.S. Pat. No. 6,111,019; U.S. Pat. No. 6,355,757; U.S. Pat. No. 6,391,998; U.S. Pat. No. 6,417,281; U.S. Pat. No. 6,300,451; U.S. Pat. No. 6,114,457; U.S. Pat. No. 6,734,265; U.S. Pat. No. 6,147,180; U.S. Pat. No. 6,870,010; U.S. Pat. No. 5,670,595; U.S. Pat. No. 4,565,847; U.S. Pat. No. 4,784,885; U.S. Pat. No. 3,568,252; WO 2007/067307; WO 2002/085954; US 2008/179780; US 2007/0260016; US 2005/0154136; US 2013/0090433; EP 0 544 098 A; CN 102863685; JP 2002179855 A; JP 2011231260 A; JP 7309983 A; JP H06136197 A; JP H06136194 A; and Guzman, et al., 56(5) *AIChE Journal*, 1325-1333 (2010).

SUMMARY OF THE INVENTION

The invention provides for a polyethylene composition comprising the product of the combination of:
a) at least one copolymer comprising units derived from at least 85 wt % ethylene and a $C_3$ to $C_{10}$ α-olefin, the at least one copolymer having a density from 0.905 g/cm³ to 0.930 g/cm³ and a melt index ($I_{2.16}$) from 0.20 g/10 min to 10.0 g/10 min; and
b) from 0.10 wt % to 10 wt % of a cyclic-diene terpolymer (CDTP), by weight of the composition; the CDTP comprising units derived from 0.01 wt % to 10.0 wt % cyclic-diene units, from 0.01 wt % to 20 wt % of $C_3$ to $C_{10}$ α-olefin units, and ethylene units.

DETAILED DESCRIPTION OF THE INVENTION

Figure 1A:
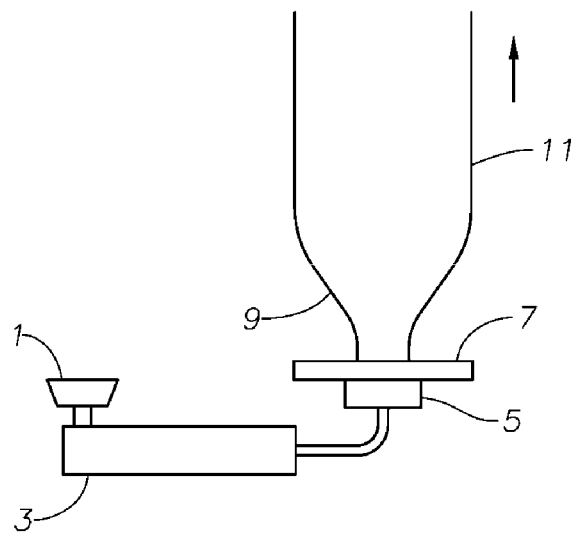
FIG. 1A is a diagrammatic depiction of a blown film process.

The inventors have surprisingly found that the addition of a minor amount of a cyclic-diene terpolymer ("CDTP") with a polyethylene, especially LLDPE, in combination with a film process with a means for cooling the forming melted film that provides some distance from the die from which the film emanates, yields significant enhancement of a number of the blown film's properties. In this film forming process, a cooling device such as an air ring, for example, is elevated (moved a distance from the die) allowing for more effective cooling of the forming film. It is believed that this allows the polymer molecules to "relax" in the melt for a period of time after the melt exits the die, and thus providing the distance allows such relaxation prior to crystallization of the polyethylene, effecting the properties of the film such as impact strength, tear strength, tensile properties, etc of the blown film derived from the inventive process. In the molten or semi-molten state, the molten polymer is stretched in both the TD and MD directions after it reaches the elevated air ring. Then the film is subjected to effective cooling from, for example, both a trip-lip air ring and internal bubble cooling, common in blown film processes. It is evidenced that this new process and CDTP addition provide a balanced MD-TD orientation; hence, the film exhibits enhanced physical properties. Desirably, the combination of CDTP and separation between the cooling and the die also creates a desired crystal size and morphology, which result in the enhanced stiffness and excellent optical property.

Process to Produce a Film

Thus the invention in any embodiment is a method of forming a blown film comprising extruding a molten composition through a die opening to form a film, wherein the molten composition comprises at least one polyethylene and within the range from 0.10 wt % to 10 wt % of a cyclic-diene terpolymer (CDTP) by weight of the composition, the extruder having a die opening from which the molten composition film emanates. In any embodiment the invention further includes causing the film to progress in a direction away from the opening. At this point the film may be molten, partly molten (that is, having solidified at least partly) or completely solidified but still softened due to an elevated temperature but lower than the melt temperature upon extrusion. The process further includes cooling the molten composition in the form of a film at a distance from the die opening, the distance adjusted to allow relaxation of the molten composition prior to solidification and/or crystallization upon cooling; and isolating a blown film therefrom.

By "at a distance from the die," what is meant is that the "cooling," such as a cooling ring that blows air on the forming film, is located at least 1 or 2 or 4 or 8 cm from the die (or other distance as described further herein) preferably measured from the top or outer edge of the die to the base of the cooling device.

Also, by "causing the film to progress," what is meant is that the film forming from the die opening from hardening polyethylene is pulled or pushed mechanically or by some other means such as by air pressure (negative or positive) away from the die to create a continuous blown film.

In a typical process, a polyethylene melt is extruded through a die such as an annular slit die, usually vertically, to form a thin walled tube. Cooling preferably in the form of air is introduced via a ring in the center of the die to blow up the tube like a balloon. Cooling could also be effectuated by other means, and the air may be nitrogen/oxygen or other gases or mixtures of gases or liquids. Mounted on top of the die, a high-speed air ring blows onto the hot film to cool it. In the present invention, additional cooling occurs at some distance "H" (see FIG. 1B) from the die, which is at least 1 cm as defined above, preferably, cooling on the outside surface of the film. The tube of film can then continue upwards (see arrows in FIGS. 1A and 1B), continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

Desirably, the % crystallinity ($\chi$) of the forming film (in the vicinity "B" in FIG. 1A) or the finished, blown film (any point after "27" in FIG. 1A) could be measured as described below, and this could be used to aid in adjusting the distance of the cooling and the amount of "relaxation" or crystallization of the forming film. For instance, the distance could be adjusted to keep % crystallinity ($\chi$) of the film in the vicinity of "H" below 50% or 40% or 30% or 20% or 10%, or between 1 or 5 or 10% to 15 or 20 or 30% crystallinity. Further, the distance "H" can be adjusted to any fall within one of the crystallinity relationships expressed in (I) and/or (II), discussed further below.

The lay-flat film is then either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is done either in line with the blown film process or at a later stage.

Preferably, the expansion ratio between die and blown tube of film would be 1.5 to 4 times the die diameter. The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film, which is drawn down along the extrusion direction only.

A typical prior art blown film process is described with reference to FIG. 1A, where the ingredients used to form the film are added in any desirable form, preferably as granules, in hopper 1, which feeds the material to the extruder 3, where the materials are melt blended at a desirable temperature through shear forces and/or heating. The molten material is then fed, with or without filtering, to a die 5 which is also heated to a desired temperature and then forced from the die in the direction of the arrow in FIG. 1A. The cooling of the forming film takes place via 7, preferably a device that blows air that is at least 5 or 10° C. cooler than the surrounding air, where the "surrounding air" is air that is at least 1 meter from the cooling device, but less than 5 meters. The air preferably blows against the outside of the film, most preferably around the entire circumference formed by the film. There is also air blown internally that both cools and blows the film up like a balloon. The film 9 starts to expand where it eventually cools and crystallizes to form blown film 11.

Figure 1B:
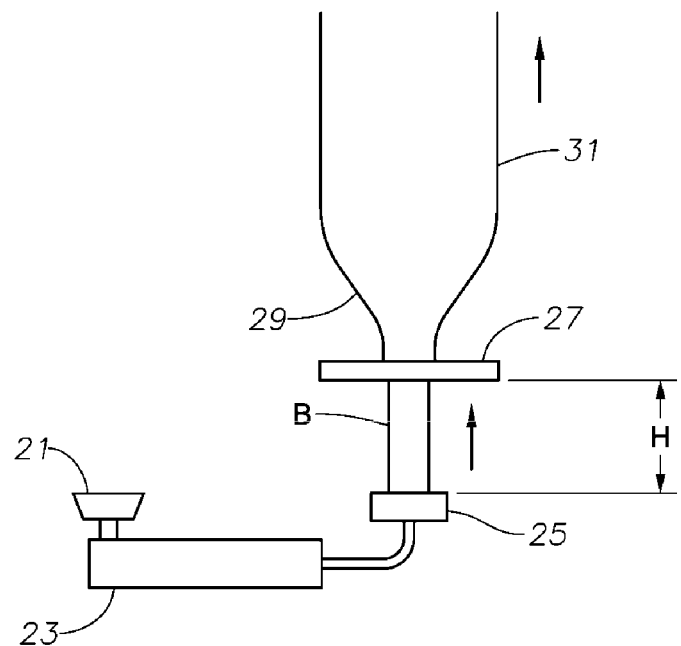
FIG. 1B is a non-limiting diagrammatic depiction of the inventive process, wherein "H" is the distance between the cooling device and the die.

The inventive process is described with reference to FIG. 1B, where the actual apparatus useful in such a process shares many of the features in FIG. 1A. Materials used to form the film is fed into the extruder 23 via hopper 21, where the materials are melt blended and transferred in the molten state, a partly molten state, or softened due to some cooling to the die 25. Here, unlike in the prior art process, the forming film "B" is allowed to form in the direction of the arrow for a time and distance "H" until reaching the cooling device 27, again preferably a device that blows air that is at least 5 or 10° C. cooler than the surrounding air. The medium, such as air, around the forming film B may be controlled so as to facilitate relaxation of the film in its molten or softened state during the time spent in the H distance. The forming film B desirably spends from 0.5 or 1 or 5 seconds to 10 or 20 seconds in the zone described by the distance H in FIG. 1B. Preferably, the cooling air is at a temperature within the range from 5 or 10° C. to 15 or 20 or 25 or 30° C.; and preferably the surrounding temperature in the expanding area of the forming film 29 is within a range from 20 or 30° C. to 50 or 60° C. The film then expands and cools in the region 29 as it is cooled by, for example, cooler air blowing from 27, where a finished, blown film 31 is eventually isolated by various means such as by rollers, nips, etc.

The "distance" can be any distance from the die, preferably measured from the top or outer edge of the die to the base of the cooling device. The optimal distance is one that allows for adequate relaxation of the molten composition before it crystalizes into the blown film. In any embodiment, the distance H is greater than 1, or 2, or 4, or 8 cm, or within a range of from 1, or 2, or 4, or 8 cm to 50 cm, or 60 cm, or 80 cm, or 3 meters. Stated another way, the distance can be described as the ratio of H/D and is within a range from 0.05, or 0.1 or 0.5 or 1 to 2 or 3 or 4 or 5, or 10, or 15, or 20 where H (FIG. 1B) is the distance from die exit to the "cooling device", for example, a cooling ring, and D is the diameter of a die (H and D are the same units). The cooling provided by the cooling device is preferably provided by air emanating from the device and blown around the film. Air may also be blown inside the film if the blown film is a tube, and most preferably there is air blown inside the film-tube. Such air will emanate from the center of the die, near or at the die opening, and will maintain the temperature in the vicinity "H" described above.

Preferably, the die used in the formation of the films herein is designed such that the die opening, through which the molten composition emanates, is in the form of a ring and the molten composition emanating therefrom is in the form of a continuous tube.

The performance of the polymer composition being formed into a film can be characterized in any embodiment as a Maximum Die Rate. The "Maximum Die Rate" is a normalized extrusion rate by die size which is commonly used in blow film industry. The Maximum Die Rate as used herein is expressed as following: Maximum Die Rate [lb/in-hr]=Extrusion Rate [lb/hr]/Die Circumference [inch]. Another definition of the Maximum Die Rate is expressed as following: Maximum Die Rate [kg/mm-hr]=Extrusion Rate [kg/hr]/Die Diameter [mm]. The Maximum Die Rate in the present invention at which the film is formed is greater than 13 lb/in-hr (0.73 kg/mm-hr) or 16 lb/in-hr (0.90 kg/mm-hr) or 24 lb/in-hr (1.34 kg/mm-hr) in any embodiment, or within a range from 13 lb/in-hr (0.73 kg/mm-hr) or 16 lb/in-hr (0.90 kg/mm-hr), or 24 lb/in-hr (1.34 kg/mm-hr) to 30 (1.69 kg/mm-hr), or 40 lb/in-hr (2.25 kg/mm-hr); and preferably the Maximum Rate of extrusion is within a range from 350 lb/hr (159 kg/hr) to 500 lb/hr (227 kg/hr). Note that for the "Maximum Die Rate" in the English unit, the die dimension is the die circumference, while in metric unit, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

Polyethylene Blend

The inventive method in any embodiment includes the extrusion of a molten composition which is a polyethylene blend comprising at least one polyethylene and at least one CDTP. The "polyethylene" that is useful in making films is preferably any type of homo- or co-polymer derived from ethylene and $C_3$ to $C_{10}$ α-olefins, most preferably comprising at least 80, or 85, or 90, or 95 wt % ethylene derived units (meaning that the polymer itself comprises the named amount of "mer" units that come from ethylene). When referring to a "at least one polyethylene" or "molten composition," this includes the possibility of having a blend of two or more polymers fitting that description. Preferably, the polyethylene is a linear low density polyethylene having a density within the range from 0.850 or 0.900 or 0.905 or 0.910 g/cm³ to 0.915 or 0.918 or 0.920 or 0.925 or 0.930 g/cm³. Also the linear low density polyethylene preferably has a melt index (ASTM D 1238 190° C., 2.16 kg) within the range from 0.20 or 0.40 or 0.60 or 0.80 g/10 min to 1.00 or 1.20 or 1.40 or 1.60 or 2.00 or 3.00 or 4.00 or 5.00 or 8.0, or 10.0 g/10 min. In any embodiment, the polyethylene has a molecular weight distribution (Mw/Mn) within the range from 1.8 to 2.0 or 2.5 or 4.0 or 3.5 or 4.0.

In any embodiment the polyethylene comprises within the range from 0.10 or 0.50 wt % to 2.0 or 3.0 or 5.0, or 10 wt % of a CDTP. They can be blended together by any known method such as dry blending of pellets/granules of the material followed by melt extrusion to form an intimate blend suitable for forming blown films, foamed articles such as plates and cups, and other useful articles. The blending can take place prior to forming films or other articles, thus forming pellets or granules of the blend that can be shipped and/or stored, or the blending can take place in the melt blending apparatus (e.g., screw extruder) used in the film forming or foamed article process equipment. In either stage, other additives can also be added that are common in the art such as antioxidants, slip agents, etc.

In any embodiment the CDTP comprises ethylene, within a range from 0.01, or 0.10, or 0.50 wt % to 3.0, or 4.0, or 5.0, or 8.0, or 10.0 wt % cyclic-diene derived units, and within the range from 0, or 0.10, or 0.50 wt % to 5.0, or 10.0, or 15.0, or 20.0, or 25.0, or 30.0 wt % of $C_3$ to $C_{10}$ α-olefin derived units, especially propylene, 1-butene, 1-hexene, or 1-octene derived units, based on the weight of the CDTP. The CDTP is an ethylene-based terpolymer, meaning that other than the cyclic-diene and other α-olefin derived units, the CDTP consists of ethylene derived units. Preferably, the inventive CDTPs comprise within the range from 70, or 80 wt % to 98, or 99.99 wt % ethylene-derived units.

In any embodiment the cyclic diene-derived units are selected from the group consisting of dicyclopentadiene (DCPD), norbornadiene (NBD), 5-vinyl-2-norbornene (VNB), ethylidene norbornene (ENB), derivatives thereof, and combinations thereof. Most preferably, the cyclic-diene units derive from 5-vinyl-2-norbornene (VNB). Useful CDTPs in the present invention can be made by any suitable means, but in any embodiment, the methods used in U.S. Pat. No. 7,511,106 are used, most preferably, a solution metallocene process. Examples of commercially available CDTP's include certain Vistalon™ EPDM grades from ExxonMobil Chemical Company.

Useful CDTPs are highly branched terpolymers, and preferably have a bimodal molecular weight distribution. As determined by GPC (MALLS-3D or DRI analysis), in any embodiment the CDTPs have a $g'_{vis}$ of less than 0.80, or less than 0.60, or less than 0.40, or within a range from 0.30, or 0.40 to 0.60 or 0.80, or 0.90. The branching may also be described by a "Branching Index" ("BI"), which in any embodiment, the CDTP has a value of less than 0.80, or 0.60, or 0.40, or within a range from 0.20, or 0.25 to 0.50 or 0.60.

In any embodiment the CDTPs have an $M_{n(DRI)}$ within a range of from 18,000, or 20,000 g/mol to 40,000, or 80,000 g/mol. In any embodiment the CDTPs have an $M_{w(MALLS)}$ within a range of from 200,000, or 300,000 g/mol to 800,000, or 1,000,000 g/mol. In any embodiment the CDTPs have an $M_{z(MALLS)}$ within a range of from 900,000, or 1,000,000, or 1,500,000 g/mol to 2,800,000, or 3,000,000, or 3,400,000 g/mol. In any embodiment the CDTPs have an $M_{w(MALLS)}/M_{n(DRI)}$ within the range of from 5.0, or 8.0, or 10.0, or 12.0 to 24.0, or 28.0, or 30.0. In any embodiment the CDTPs have an $M_{z(MALLS)}/M_{w(MALLS)}$ of greater than 2.0, or 3.0, or 4.0, or within a range from 2.0, or 3.0, or 4.0 to 6.0, or 10.0, or 14.0. In any embodiment the CDTPs have an $M_{z(MALLS)}/M_{n(DRI)}$ of greater than 50.0, or 60.0, or 80.0, or within a range from 50.0, or 60.0, or 80.0 to 110, or 120, or 140.

Finished Film

The improvement resulting from the process can be seen in the lamellar structure of the inventive films. This is reflected in SAXS/WAXS data acquired on the finished, blown films. This technique yields information pertaining to the crystal structure of the materials ($f_{LAM}$ and $f_c$). These results can be described with respect to other properties, namely the Average Secant Flexural Modulus (ASC) and Dart Impact (DI). Thus in any embodiment the blown film follows one of the relationships (I):

$$20,676 \text{ (psi)} < ASC \cdot 44094 \cdot f_{LAM} < 24,676 \text{ (psi); or}$$

$$18,676 \text{ (psi)} < ASC \cdot 44094 \cdot f_{LAM} < 26,676 \text{ (psi); or}$$

$$16,676 \text{ (psi)} < ASC \cdot 44094 \cdot f_{LAM} < 28,676 \text{ (psi);} \quad (I)$$

wherein $f_{LAM}$ is the Orientation of lamellae stacks to MD in MD-TD plane [-], and ASC is the 1% Average Secant Flexural Modulus [psi]. The "[-]" means that the parameter is unitless. Also in any embodiment the blown film follows one of the relationships (II):

667 (g/mil)<DI+27.8·$f_c$·100<1,067 (g/mil); or 567 (g/mil)<DI+27.8·$f_c$·100<1,167 (g/mil); or 467 (g/mil)<DI+27.8·$f_c$·100<1,267 (g/mil); (II)

wherein $f_c$ is Orientation of c-axis of crystal [-], and DI is Dart Impact [g/mil]. Both (I) and (II) are presented graphically, with the experimental data included, in FIGS. 8A and 8B, where the dashed lines represent the different ranges expressed in the equations above.

Figure 5:
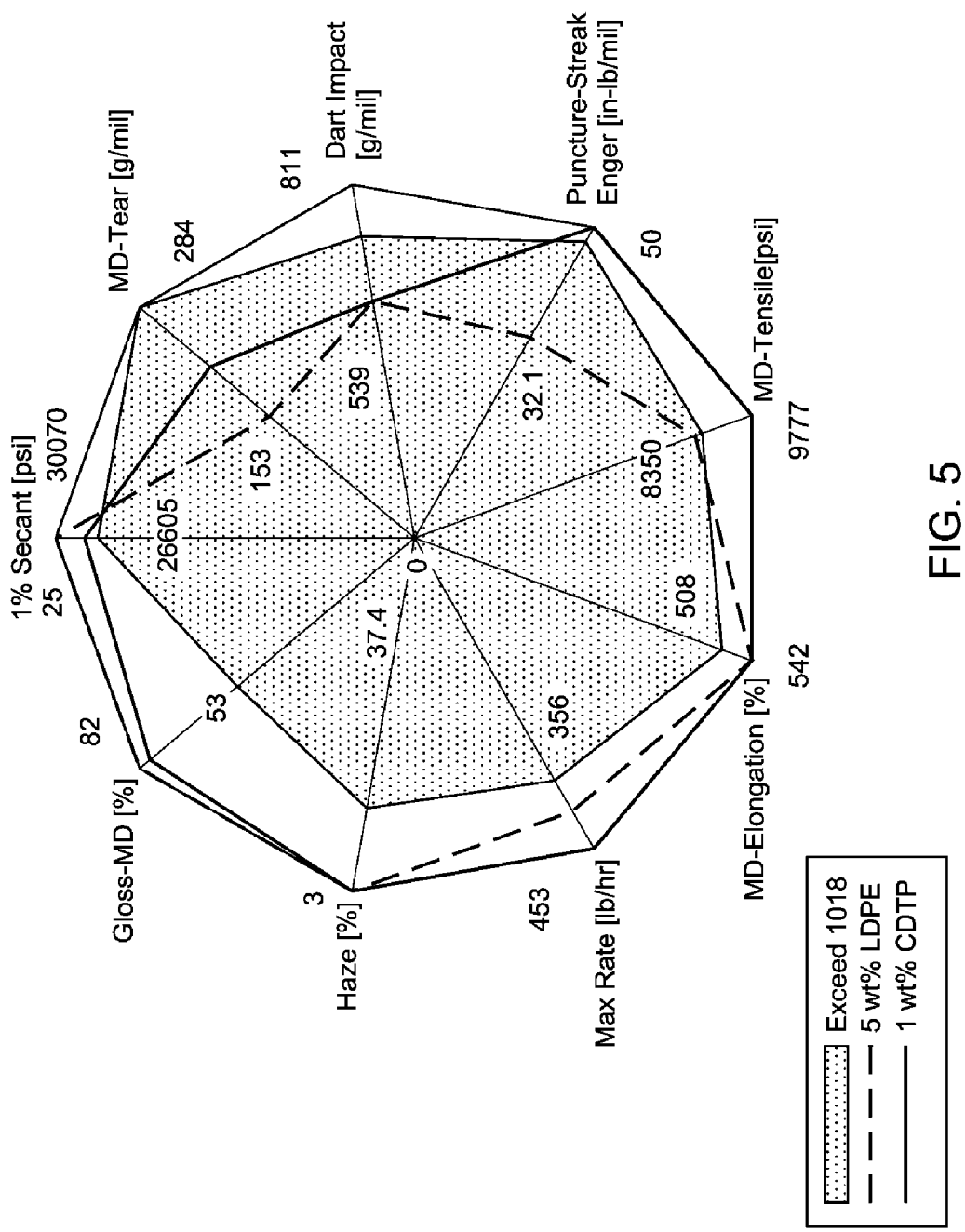
FIG. 5 is a "radar" plot of various measured blown film parameters and processing features for Exceed™ LLDPE, Exceed with 5 wt % LDPE, and Exceed with 1 wt % of the CDTP.

The inventive films made from the polyethylene/CDTP blends have many useful properties relative to the polyethylene alone used to make a film, as demonstrated by the inventors and summarized graphically in the comparison diagram of FIG. 5. In particular, in any embodiment the MD Tensile Strength of the blown film is within a range from 8000 psi (55 MPa) to 16,000 psi (110 MPa). Also in any embodiment the MD Elongation of the blown film is within a range from 480% to 680%. Finally, in any embodiment the Gloss (ASTM D2457, 60°) of the blown film is greater than 60, or 70, or 80%. Also, in any embodiment the 1% Average Secant Flexural Modulus of the inventive film is within a range from 25,000 (172), or 28,000 psi (193 MPa) to 35,000 (241), or 40,000 psi (276 MPa) in either the MD or TD; and in any embodiment the Dart Impact is within a range from 400, or 420 g/mil to 500, or 550, or 600, or 650, or 700, or 800, or 900, or 1000 g/mil. The blown film in any embodiment has a thickness within the range from 10 or 15 μm to 50 or 75 or 100 or 150 μm.

Figure 6:
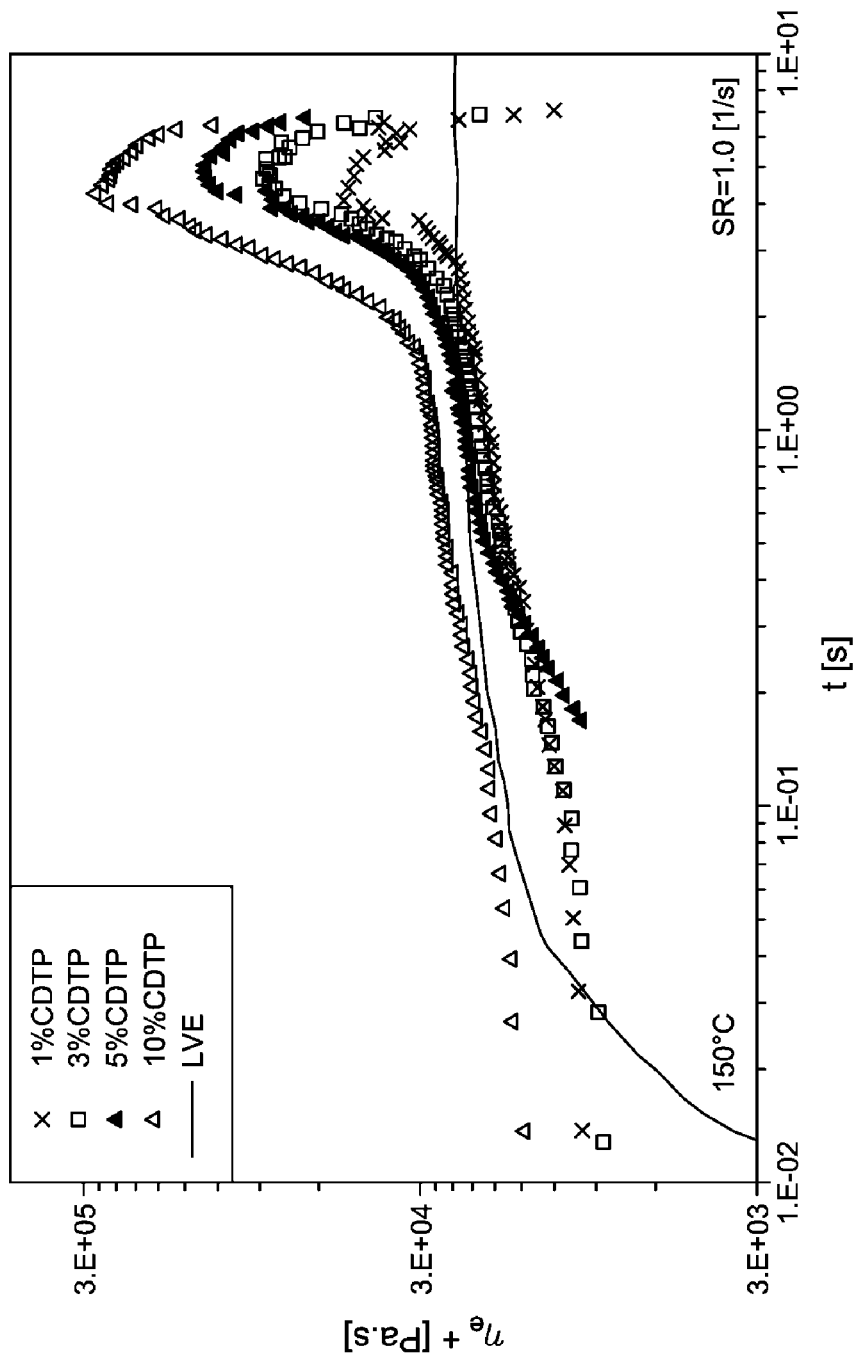
FIG. 6 is an exemplary Strain Hardening plot of $\eta_e$ [eta(e), extensional viscosity] versus time for one of the inventive examples.

Due to the improved strain hardening character of the polyethylene/CDTP blends, as demonstrated in FIG. 6, the inventive process also includes making foamed articles, and the foamed articles therefrom. Useful foaming agents are well known in the art and can be added to the desired degree to afford closed cell structures in the forming article. Useful articles include cups, plates, and other articles where foamed polystyrene is of practical use.

The various descriptive elements and numerical ranges disclosed herein for the inventive film forming process and the inventive films can be combined with other descriptive elements and numerical ranges to describe the invention(s); further, for a given element, any upper numerical limit can be combined with any lower numerical limit described herein, including the examples in jurisdictions that allow such ranges. The features of the invention are demonstrated in the following non-limiting examples.

EXAMPLES

Test Methods

All test methods are well known in the art and published in US 2013-0090433 A1. The crystallization and melting point temperatures were determined by Differential Scanning calorimetry at 10° C./min. The high load melt flow ($I_{21}$ or HLMI) parameters are determined per ASTM D 1238 190° C., 21.6 kg. Polymer molecular weight (weight-average molecular weight, Mw, number-average molecular weight, Mn, and z-averaged molecular weight, Mz) and molecular weight distribution (Mw/Mn) are determined using Size-Exclusion Chromatography. Equipment consists of a High Temperature Size Exclusion Chromatograph (either from Waters Corporation or Polymer Laboratories), with a differential refractive index detector (DRI), an online light scattering detector, and a viscometer (SEC-DRI-LS-VIS). For purposes of the claims, SEC-DRI-LS-VIS shall be used. Three Polymer Laboratories PLgel 10 mm Mixed-B columns are used. The nominal flow rate is 0.5 cm³/min and the nominal injection volume is 300 μL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 μm glass pre-filter and subsequently through a 0.1 μm Teflon filter. The TCB is then degassed with an online degasser before entering the SEC.

For ethylene copolymers with alpha-omega-dienes, propylene and $C_3$ to $C_{10}$ α-olefins, the presence of long chain branched structures in the CDTPs can be detected using nuclear magnetic resonance spectroscopy (NMR). In $^{13}$C-NMR the CDTPs are dissolved in tetrachloroethane-d2 at 140° C. and the spectra are collected at 125° C. Assignments of peaks for ethylene/propylene, ethylene/butene, ethylene/hexene, and ethylene/octene copolymers have been reviewed by James C. Randall in 29(2) *Polymer Reviews*, 201-317 (1989). Assignments for propylene/butene, propylene/pentene, propylene/hexene, propylene/heptene, and propylene/octene are presented by U. M Wahner, et al., in 204 *Macromol. Chem. Phys.*, 1738-1748 (2003). These assignments were made using hexamethyldisiloxane as the internal standard. To convert them to the same standard used in the other references, add 2.0 to the chemical shifts. Assignments and a method of measuring decene concentration have been reported for propylene/ethylene/decene terpolymers in Escher, Galland, and Ferreira in 41 *J. Poly. Sci., Part A: Poly. Chem.*, 2531-2541 (2003); and Ferreira, Galland, Damiani, and Villar in 39 *J. Poly. Sci, Part A: Poly. Chem.*, 2005-2018 (2001). The peaks in the $^{13}$C-NMR spectrum of ethylene/norbornadiene copolymers are assigned by Mönkkönen and Pakkanen in 200 *Macromol. Chem. Phys.*, 2623-2628 (1999); and Radhakrishnan and Sivaram in 200 *Macromol. Chem. Phys.*, 858-862 (1999). More details are disclosed in US 2013-0090433 A1.

The branching index ($g'_{vis}$, also referred to herein as g') is calculated using the output of the SEC-DRI-LS-VIS method (described in U.S. Pat. No. 7,807,769 for g'), and as described in WO 2014/070386.

X-Ray Test Methods

Each set of polymer film was interrogated using Small- and Wide-Angle X-ray Scattering (SAXS/WAXS) techniques. The X-ray source was a Xenocs GeniX3D microfocus source (with a Copper target (wavelength=0.154 nm)) and a SAXSLAB Ganesha 300XL Plus system. The film was placed in a sample holder, under vacuum at room temperature and the SAXS, MAXS and WAXS data were collected by changing the sample-to-detector distances from 1041 mm, 441 mm and 90 mm respectively. The SAXS, MAXS and WAXS data were collected using a 2D Dectris Pliatus vacuum compatible detector. The MAXS data essentially connects the SAXS and WAXS data in such a way that we can collect data over a wide angular range, which corresponds to real-space dimensions of 2.

The 2D X-ray patterns showed that all materials had an inherent degree of molecular orientation: both in the small scale crystal (obtained from WAXS) and in the larger range order which describes how these crystals connect via amorphous non-crystalline chains (obtained from SAXS). The molecular orientation is observed by an anisotropic pattern: the scattering rings are not uniform in intensity; indicative of more molecules being oriented in one specific direction, in our case, this direction is the machine direction (MD). The quantification of this orientation is done by calculating at which angle the greatest intensity lies and to what extent. These angles are then used to compute the Hermans Orientation Function ($f_H$). The $f_H$ can be computed for both SAXS and WAXS data, $f_H$ from SAXS data describes the ordering in the crystal stacks, or lamellae, connected by amorphous polymer chains. The $f_H$ from WAXS describes the order of the individual crystallites within the lamellae. A $f_H$ value of zero indicates anisotropy (no order), a value of one (1) indicates perfect parallel alignment to MD, and a value of $-0.5$ indicates perfect perpendicular alignment to MD. For PE blown film, positive fractional values of $f_H$ are obtained, indicating preferential alignment to MD, but not perfect alignment.

The extent of crystallinity (or "relaxation"), or amount of polymer chain that crystallized, can also be calculated from the WAXS data. The 2D images are collapsed to an Intensity versus Angle profile and the two sharp peaks observed for PE are fitted to a Gaussian function and the areas are calculated. The ratio of these peak areas to the total area under the scattering profile yields the extent of crystallinity.

The inter-crystalline (or lamellae) spacing can also be calculated from SAXS from the peak maximum once the 2D SAXS data are collapsed to a 1D intensity versus Angle profile.

Extensional Rheology

Extensional rheology is performed at 150° C. using a Sentmanat Extensional Rheometer-2 (SER-2) mounted in a rotational rheometer MCR 501 (Anton-Paar). The SER-2 consists of two counter-rotating drums on which the film sample is mounted at 150° C. and secured with pins. One of the drums is connected to the rheometer torque transducer and rotational motor, which imposes pure uniaxial extensional deformation on the sample. Values of the imposed strain rate and measured torque are used to calculate the extensional viscosity. The film specimens are prepared by compression molding at 200° C. The specimen typical dimensions are 12.7 mm×12.7 mm×0.5 mm. Additionally, the linear viscoelastic (LVE) envelope is obtained from start-up of steady shear experiments with a cone and plate fixture, and using Trouton's rule in extension transient mode, $h_e^+ = 3h^+$, where $h_e^+$ is the extensional viscosity, and $h^+$ is the shear viscosity.

Figure 2:
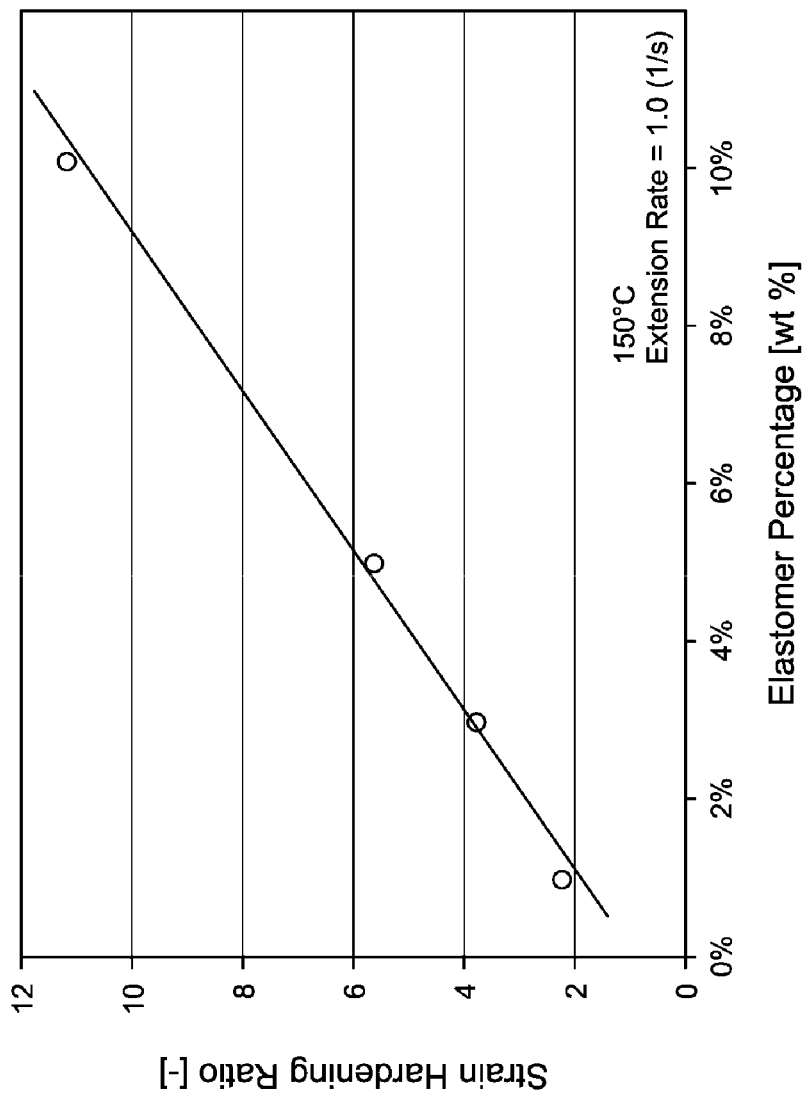
FIG. 2 is a graphical plot of the strain hardening of CDTP/LLDPE polyethylene blends as a function of the weight percentage of CDTP additive.

The relationship between strain hardening and the amount of CDTP is shown in FIG. 2, where SHR=100.7·V %+0.8551; where:

SHR: strain hardening ratio [-]
V %: elastomer percentage [wt %]
Where $$SHR = \frac{h_{E,peak}}{h_{E,LVE}}$$

Where [eta(e)$_{peak}$] $\eta_{e,\,peak}$ is the peak extension viscosity in strain hardening region; and
[eta(e)$_{LVE}$] $\eta_{e,\,LVE}$ is the extension viscosity linear viscoelastic region.

For pure LLDPE, there is no strain hardening phenomenon, so the SHR is 1 (slope of line), and for the inventive blend is preferably within a range from 1.0 to 2.0 or 3.0.

1% Average Secant Flexural Modulus (ASC, or "Secant Flexural Modulus", or "Flex Mod"), is measured as specified by ASTM D-882.

Dart F50, or Dart Drop Impact or Dart Impact (DI), reported in grams (g) and/or grams per mil (g/μm), is measured as specified by ASTM D-1709, method B, using a dart with a phenolic composite head.

Branching Index

The Branching Index (BI) for the inventive CDTPs were determined using GPC-LS as described here. The platform for both GPC-LS and GPC-DRI is a Waters 150-C GPC equipped with multiple detectors. The test features include filtered TCB (0.1-0.15% BHT antioxidant) as sample prep and mobile phase solvent, 135° C. operating temperature, 0.5 mL/min flow rate, about 0.1-0.5 mg injected mass (varies with $M_w$), and 2 hour run times.

The branching in highly branched polymers such as ethylene-propylene-diene type elastomers have historically been described by the "Branching Index" (BI) in characterizing the extent of long-chain branching in such polymers. The definition is (1):

$$BI = \frac{(M_w)_{linear}}{(M_w)_{branched}} \frac{(M_v)_{branched}}{(M_v)_{linear}} \tag{1}$$

where "branched" refers to values measured for the real polymer, and "linear" refers to values predicted for an equivalent polymer (same apparent molecular weight distribution) without long-chain branching. The DRI analysis results are used to calculate the latter: $(M_w)_{linear}=M_w(DRI)$ and $(M_v)_{linear}=M_v(DRI)$. These assignments are appropriate because the DRI analysis uses Mark-Houwink parameters for linear polymers to calculate M Likewise, since light scattering measures the true M regardless of chain architecture, the assignment $(M_w)_{branched}=M_w(LS)$ is made. Calculation of the last parameter, $(M_v)_{branched}$, requires [η] (eta) for the bulk polymer in order to make use of the definition of $M_v$ (2):

$$[\eta]_{bulk}=kM_v^\alpha \tag{2}$$

where k and η are the standard Mark-Houwink parameters. Note that $[\eta]_{bulk}$ (eta) is measured for the real polymer, so $M_v$ thus calculated reflects the branched structure and not its linear equivalent—even though the "linear" k and η (eta) are used in Equation (2). The $[\eta]_{bulk}$ (eta) for the BI calculation is typically measured in decalin. This is an entirely independent experiment from the GPC-LS analysis, requiring a separate sample of the polymer.

Another approach is possible with a GPC-3D instrument with a viscosity detector is to use the on-line viscometer that allows the calculation of an average [η] (eta) which is equivalent to $[\eta]_{bulk}$ (eta) that would be measured for the whole polymer in TCB at 135° C. The results of each measurement for the same sample was used to calculate the other parameters that go into calculating BI, making the calculation internally consistent.

The BI values can be compared to another types of measurements used to characterize long-chain branching, the more conventional g' parameter (3):

$$g' = \frac{[\eta]_{branched}}{[\eta]_{linear}} \tag{3}$$

GPC-3D reports include g' as a function of molecular weight, as well as an average g' value, defined as the ratio of the measured average (i.e., bulk) [η] (eta) to the value predicted by substituting $M_v$ from the light scattering analysis into Equation (2):

$$g'_{avg} = \frac{[\eta]_{avg}}{k(M_v(LS))^\alpha} \quad (4)$$

BI and $g'_{avg}$ for Vistalon™ grades of ethylene-based diene elastomers have been compared and they correlate well for lightly branched polymers (index close to 1). As the branching level increases, g' becomes less sensitive to changes in branching level and BI is a more accurate measure of branching level.

Example CDTPs

The CDTP used in the present invention is an ethylene-propylene-vinylidene norbornene terpolymer made according to U.S. Pat. No. 7,511,106 having 79 wt % ethylene derived units by weight of the terpolymer, 0.96 wt % of VNB based on the weight of the terpolymer, where the remainder is propylene derived units; and has an MI ($I_2$) of 0.05 g/10 min, an MIR ($I_{21}$) of 16.6 g/10 min, and a density of 0.885 g/cm³. The terpolymer is also blended with 0.16 wt % of Irgafos™ 1076 antioxidant. The measure of branching, $g'_{vis\ avg}$ is 0.36, and BI is 0.22. The "polyethylene" used in these examples was Exceed™ 1018, which has a peak melting point temperature of 118° C., an MI ($I_2$) of 1 g/10 min and a density of 0.918 g/cm³. The branching (g'vis avg) value for the polypropylene resin was between about 0.97 and 1.0, and exhibits no extensional viscosity (no peak on the plots as in FIG. 6).

Figure 3:
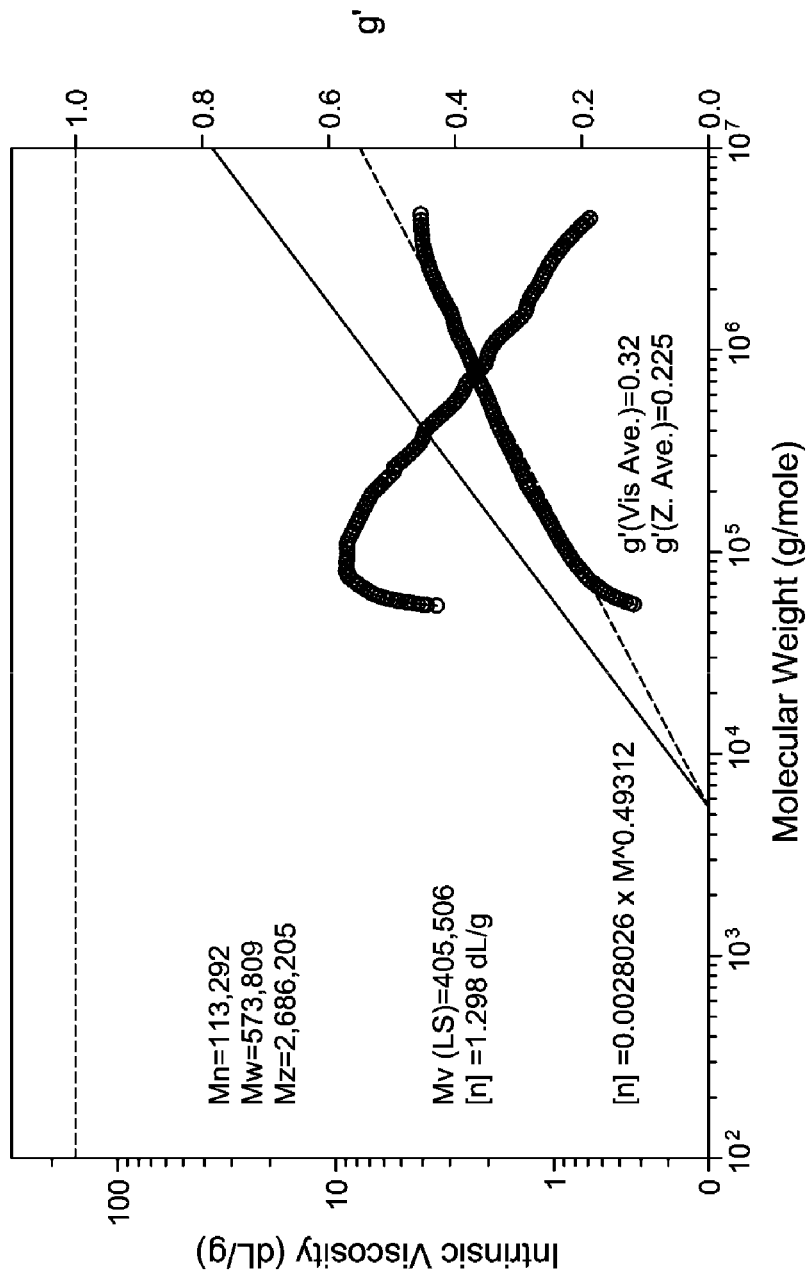
FIG. 3 are GPC chromatograms of polymers used in the Examples from DRI and MALLS analysis showing CDTP branching behavior.
Figure 4:
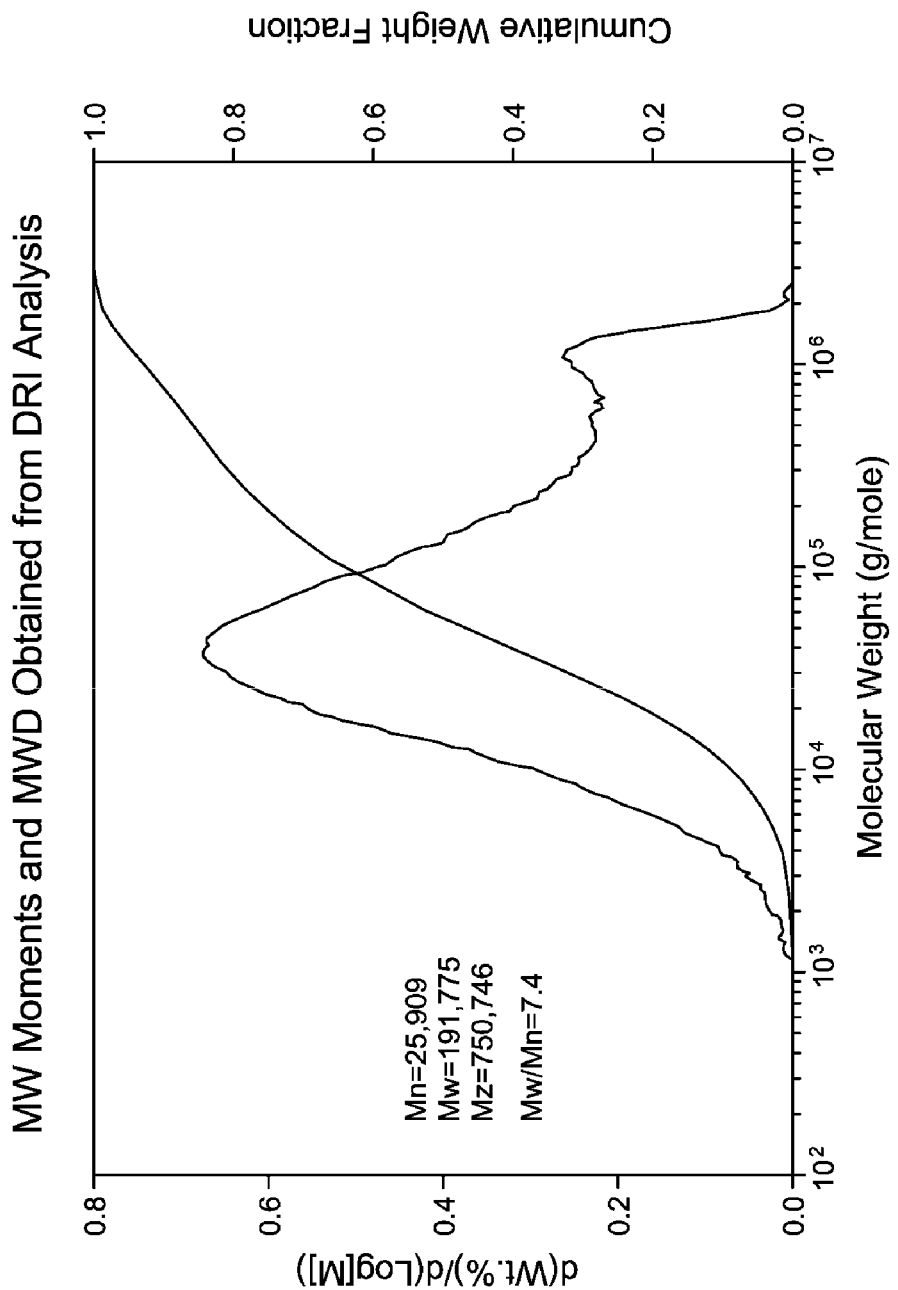
FIG. 4 are GPC chromatograms of polymers used in the Examples from DRI and MALLS analysis showing CDTP molecular weight distribution and other characteristics.

Gel Permeation Chromatograph (GPC) was performed on the CDTP used in the Examples, the results of which are shown in FIGS. 3 and 4. The results are also summarized in Table 1. The adjusted flow rate (ml/m) in the columns was 0.559, and LS to DRI (ml) was 0.192, and LS to Vis (ml) was 0.391, where the DRI constant was 0.0002246. The MALLS analysis is relied upon for Mw and Mz when calculating, for example, Mw/Mn, or Mz/Mn, which is a better method for measuring highly branched polymers, while DRI values are used for Mn, which is more sensitive and detects smaller molecules.

TABLE 1

GPC results for the CDTP of the inventive films

| Parameter | DRI analysis | MALLS analysis |
|---|---|---|
| Mn (g/mole) | 25,909 | 113,292 |
| Mw (g/mole) | 191,775 | 573,809 |
| Mz (g/mole) | 750,746 | 2,686,205 |
| Mw$_{(MALLS)}$/Mn$_{(DRI)}$ | | 22 |
| Mz$_{(MALLS)}$/Mw$_{(MALLS)}$ | | 4.7 |
| Mz$_{(MALLS)}$/Mn$_{(DRI)}$ | | 103 |

Extensional Rheology experiments were carried out as described herein on LLDPE blends with 3 wt % of the inventive CDTP. Those results are shown in FIG. 6. They demonstrate that the presence of the CDTP in the LLDPE improves its strain hardening behavior.

Method of Forming Films

In the tables below, when referring to Exceed™ LLDPE, "G" stands for granule, and "P" stands for pellet. All the samples of either pure component or blends were extruded or mixed in a 57 mm Coperion twin screw extruder. The pure component (LLDPE) or the blend (LLDPE and CDTP) were pelletized and used in the subsequent blown film experiments.

The blown film fabrication experiments were conducted on a Hosokawa Alpine blown film line. Some of the general process parameters are in Tables 2A and 2B. The line was set with a 160 mm mono layer die which was connected to a 90 mm and 30 L/D single screw extruder. The films were made with a 60 mil die gap, 2.5 blow-up ratio. The targeted film gauge was 1.0 mil (25.4 microns). The air ring was a triple-lip air ring with two lips blowing chilled air upward, while one lip was blowing chilled air downward. The air ring can also be elevated from the die. Conventional air ring sits on top of the die, which was "zero" in elevation. This particular air ring can be moved up to 18 in from the die top plate, and in the examples (see Table 2A) the air ring or "cooling device" height was about 12-14 inches, the value of "H" as in Tables 2A, 4A, 5A and 6A, while the cooling air temperature in each case was 17° C. as shown in Table 2A. The surrounding air temperature was 25-30° C. The standard baseline extrusion rate was 10 lbs/in-die-circumference/hr. The maximum rate was determined to be the rate just prior to the situation where either film bubble was no longer stable.

The polymer pellets were fed into the single screw extruder via a Syncro feeding system. The polymer pellets are melted and further mixed inside the single extruder. Then the polymer melt was passed through a screen change with 20/40/40/20 mesh screen pack. The polymers melt flow horizontally into the die. The spiral distribution channel inside the die converted and distributed the flow to vertical flow uniformly. Then the polymer melt flows out the 60 mil die gap. The cold air on the inner side of polymer applied positive pressure to inflate the bubble. The two rolls on up-nip of the blown film line pull the bubble upwards. The chilled air from the air ring blows on the outer side of the bubble to accelerate cooling. The film bubble passed through two bubble cages which stabilized the bubble when it moved upward. The bubble continued to pass through a collapsing frame to collapse the bubble into a two-layer flat film. The flat film moved through the up-nip and second nip for tension control and further stabilization. Then the film was wound into film roll on a surface winder.

Figure 7:
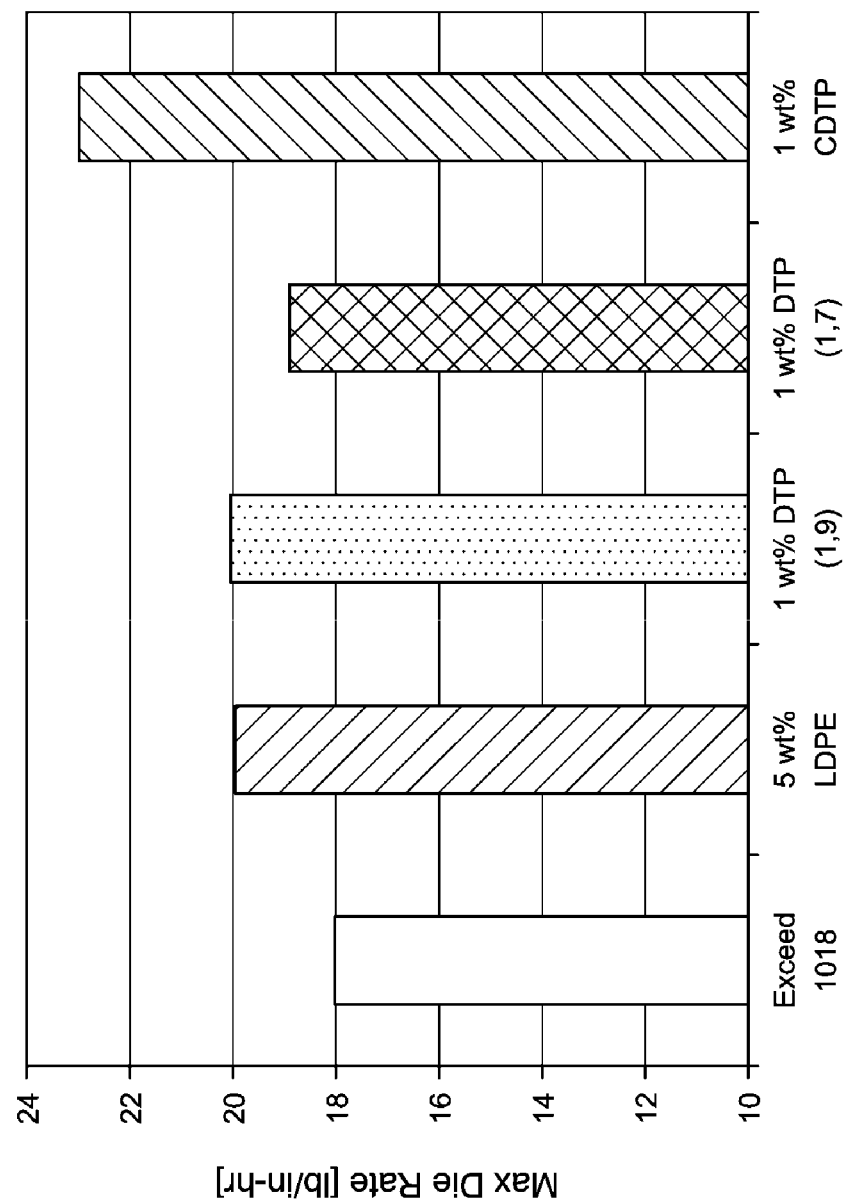
FIG. 7 is a bar plot comparing prior art methods of improving the maximum rate of film extrusion versus the use of the inventive CDTP, comparing LDPE as an additive, and the "1,9-diene" and "1,7-diene" terpolymers of US 2013/0090433 A1.

The Example films are identified in Table 3, and the results of the film production runs for each example are summarized in Tables 4A, 4B, and 4C, and Tables 5A, 5B, and 5C, and Tables 6A, 6B, and 6C. These results are summarized in FIGS. 5 and 7.

Figure 8A:
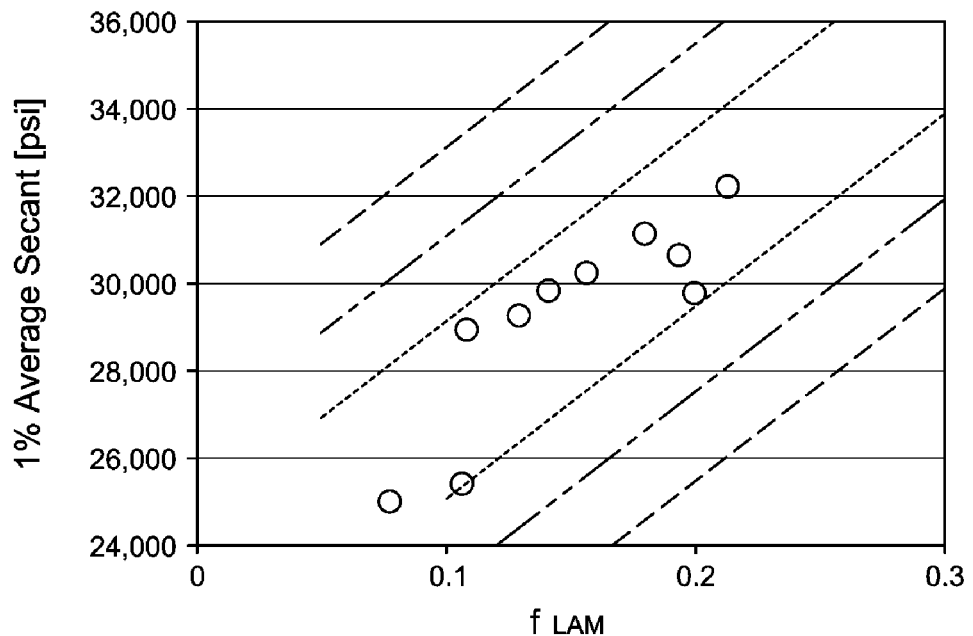
FIG. 8A and FIG. 8B are graphical representations of SAXS/WAXS measurements taken of the inventive blown films, and their relation to both 1% Secant Flexural Modulus and Dart Impact.
Figure 8B:
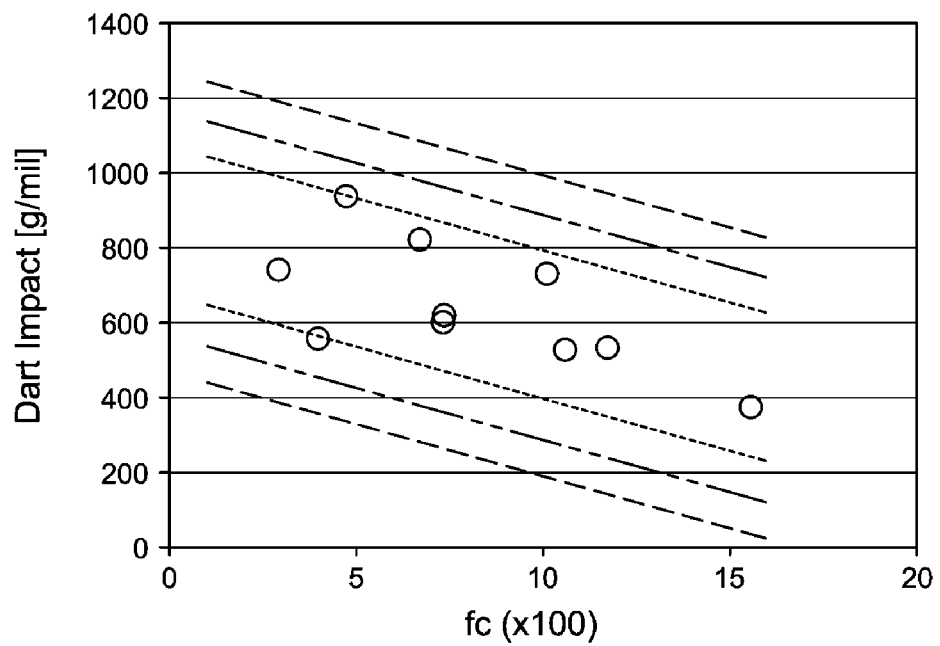

For the inventive finished, blown films, SAXS/WAXS measurements were taken, and their relation to both 1% Secant Flexural Modulus and Dart Impact are shown in FIGS. 8A and 8B. The stiffness of the blown film characterized by 1% average Secant Flexural Modulus was proportional to the orientation of lamellae stacks to MD in MD-TD plane (fLAM) measured from SAXS. The 1% average Secant Flexural Modulus is the average value of both 1% MD-Secant Flexural Modulus value and 1% TD-Secant Flexural Modulus value. The correlations are shown in FIG. 8A. Meanwhile, the film toughness characterized by the Dart Impact demonstrates an inverse proportion relation with the orientation of x-axis of crystal (fc) measured from WAXS. The correlations are shown in FIG. 8B.

TABLE 2A

Exemplary Process Data-Measured Values

| Run Parameter | Units | Value |
|---|---|---|
| Gauge | Mil | 1.04 |
| Gauge 2 s | % | 2.5 |
| BUR | no unit | 2.5 |
| Lay Flat | inch (mm) | 24.71 (627) |
| Total Extrusion Rate | lbs/hr | 198.7 |
| Frost Line Height | inch (mm) | 34 (864) |
| Line Speed (primary nip) | FPM | 158.1 |
| Extruder Speed | RPM | 26.8 |
| Extruder Load | % | 58.2 |
| Specific Output | lb/hr/rpm | 7.42 |
| Air Ring Height | inch (mm) | 13.2 (335) |
| Air Ring Position | no unit | 3 |
| Feed Throat | ° F. (° C.) | 105 (40) |
| Barrel #1 | ° F. (° C.) | 355 (179) |
| Barrel #2 | ° F. (° C.) | 370 (188) |
| Barrel #3 | ° F. (° C.) | 370 (188) |
| Barrel #4 | ° F. (° C.) | 370 (188) |
| Barrel #5 | ° F. (° C.) | 371 (188) |
| Barrel #6 | ° F. (° C.) | 370 (188) |
| Zone #7 | ° F. (° C.) | 390 (199) |
| Die #1 | ° F. (° C.) | 400 (204) |
| Die #2 | ° F. (° C.) | 400 (204) |
| Die #3 | ° F. (° C.) | 400 (204) |
| Die #4 | ° F. (° C.) | 400 (204) |

TABLE 2B

Exemplary Process Data-Measured Values

| Run Parameter | Units | value |
|---|---|---|
| Melt Temperature (3/4" in) | ° F. (° C.) | 408 (209) |
| Melt Temperature (average) | ° F. (° C.) | 410 (210) |
| Melt Temperature #1 | ° F. (° C.) | 395 (202) |
| Melt Temperature #2 | ° F. (° C.) | 409 (209) |
| Melt Temperature #3 | ° F. (° C.) | NA |
| Melt Temperature #4 | ° F. (° C.) | 411 (211) |
| Melt Temperature #5 | ° F. (° C.) | 404 (207) |
| Melt Pressure-Zone #1 | PSI (MPa) | 2,132 (14.7) |
| Melt Pressure-Zone #2 | PSI (MPa) | 4,804 (33) |
| Melt Pressure-Zone #3 | PSI (MPa) | 6,518 (44) |
| Melt Pressure-Zone #4 | PSI (MPa) | 6,950 (48) |
| Melt Pressure-Zone #5 | PSI (MPa) | 7,965 (55) |
| Melt Pressure-Zone #6 | PSI (MPa) | 6,316 (44) |
| Melt Pressure-Zone #7 | PSI (MPa) | 5,229 (36) |
| AIR Ring Speed | % | 25 |
| IBC Supply Speed | % | 64.9 |
| IBC Exhaust Speed | % | 45.5 |
| Air Ring Air Temp | ° F. (° C.) | 62 (17) |
| IBC Air Temp | ° F. (° C.) | 51 (11) |
| Exhaust Air Temp | ° F. (° C.) | 117 (47) |

TABLE 3

Sample Film Identification

| Sample No. | Identity of resin(s) and film forming run |
|---|---|
| 1 | Exceed 1018-Standard (STD) rate |
| 2 | Exceed 1018-Maximum (MAX) rate |
| 3 | 1% CDTP in Exceed 1018 G-STD rate |
| 4 | 1% CDTP in Exceed 1018 G-MAX rate |
| 5 | 3% CDTP in Exceed 1018 G-STD rate |
| 6 | 3% CDTP in Exceed 1018 G-MAX rate |
| 7 | 1% CDTP in Exceed 1018 P-STD rate |
| 8 | 1% CDTP in Exceed 1018 P-MAX rate |
| 9 | 5% CDTP in Exceed 1018 P-STD rate |
| 10 | 5% CDTP in Exceed 1018 P-MAX rate |

TABLE 4A

Process Results for Films 1-4

| Process Data | Units | 1 | 2 | 3 | 4 |
|---|---|---|---|---|---|
| Gauge (measured by lab) | mil | 1.04 | 1.04 | 0.99 | 1.04 |
| Gauge 2 σ | % | 2.5 | 3.1 | 1.9 | 4.8 |
| BUR | — | 2.5 | 2.5 | 2.5 | 2.5 |
| Lay Flat | in | 24.7 | 24.7 | 24.6 | 24.7 |
| Total Extrusion Rate | lbs/hr | 198.7 | 356 | 197.4 | 416.3 |
| Maximum Die Rate | lb/hr/in-circumference (kg/mm-hr) | 10 (0.56) | 18 (1.01) | 10 (0.56) | 21 (1.19) |
| Frost Line Height | in | 34 | 52 | 34 | 60 |
| Line Speed (primary nip) | FPM | 158.1 | 288.7 | 161.8 | 340.9 |
| Extruder Speed | RPM | 26.8 | 49.2 | 30.8 | 65.1 |
| Extruder Load | % | 58.2 | 62.3 | 56.25 | 62.5 |
| Specific Output | lb/hr/rpm | 7.42 | 7.24 | 6.40 | 6.39 |
| Air Ring Height | in (cm) | 13.2 (33.5) | 14.3 (36.3) | 14 (35.6) | 14 (35.6) |

TABLE 4B

Measured Properties for Films 1-4

| Sample ID | 1 | 2 | 3 | 4 |
|---|---|---|---|---|
| Gauge Mic (mils) | | | | |
| Average | 1.03 | 1.03 | 1.01 | 1 |
| Low | 0.98 | 0.95 | 0.94 | 0.91 |
| High | 1.09 | 1.07 | 1.1 | 1.06 |
| 1% Flex Mod (psi) | | | | |
| MD | 23,741 | 24,011 | 28,360 | 27,739 |
| TD | 26,393 | 26,957 | 32,989 | 34,506 |
| Tensile Yield Strength (psi) | | | | |
| MD | 1,316 | 1,280 | 1,431 | 1,370 |
| TD | 1,285 | 1,308 | 1,293 | 1,411 |
| Elongation @ Yield (%) | | | | |
| MD | 6.6 | 5.9 | 6.5 | 5.6 |
| TD | 6 | 5.6 | 3.9 | 4.6 |
| Tensile Strength (psi) | | | | |
| MD | 9,786 | 9,747 | 9,581 | 9,464 |
| TD | 8,558 | 8,954 | 8,392 | 8,191 |
| Elongation @ Break (%) | | | | |
| MD | 537 | 514 | 550 | 542 |
| TD | 643 | 664 | 646 | 670 |

TABLE 4C

Measured Properties for Films 1-4

| Sample ID | 1 | 2 | 3 | 4 |
|---|---|---|---|---|
| Elmendorf Tear | | | | |
| MD (g) | 258 | 245 | 236 | 215 |
| TD (g) | 364 | 391 | 427 | 512 |
| MD (g/mil) | 248 | 245 | 238 | 213 |
| TD (g/mil) | 353 | 383 | 423 | 507 |
| Haze (%) | | | | |
| | 32.8 | 37.4 | 2.9 | 3.1 |

TABLE 4C-continued

Measured Properties for Films 1-4

| Sample ID | 1 | 2 | 3 | 4 |
|---|---|---|---|---|
| Gloss (GU) | | | | |
| MD | 20 | 16 | 80 | 79 |
| TD | 19 | 17 | 81 | 79 |
| Dart Impact, Composite Method A | | | | |
| (g) | 962 | 845 | 734 | 539 |
| (g/mil) | 934 | 820 | 727 | 539 |
| Puncture, BTEC Method B | | | | |
| Peak Force (lbs) | 12.5 | 11.1 | 13.6 | 13.6 |
| Peak Force (lbs/mil) | 12.1 | 10.8 | 13.5 | 13.6 |
| Break Energy (in-lbs) | 42.3 | 35.7 | 46.3 | 48 |
| Break Energy (in-lbs/mil) | 41 | 34.6 | 45.8 | 48 |

TABLE 5A

Process Results for Films 5-8

| Process Parameter | units | 5 | 6 | 7 | 8 |
|---|---|---|---|---|---|
| Gauge | mil | 0.98 | 1.04 | 0.99 | 0.99 |
| Gauge 2 σ | % | 6.3 | 8.8 | 2.5 | 8.4 |
| BUR | | 2.5 | 2.5 | 2.5 | 2.5 |
| Lay Flat | in | 24.68 | 24.78 | 24.67 | 24.96 |
| Total Extrusion Rate | lbs/hr | 197.4 | 454.1 | 196.7 | 453 |
| Maximum Die Rate | lb/hr/in-circumference (kg/mm-hr) | 10 (0.56) | 23 (1.30) | 10 (0.56) | 23 (1.30) |
| Frost Line Height | in | 34 | 70 | 33 | 70 |
| Line Speed (primary nip) | FPM | 161.8 | 371.7 | 161.8 | 370.4 |
| Extruder Speed | RPM | 31.7 | 73.3 | 28 | 68.4 |
| Extruder Load | % | 54.85 | 62.89 | 57.03 | 64.45 |
| Specific Output | lb/hr/rpm | 6.23 | 6.20 | 7.03 | 6.62 |
| Air Ring Height | In (cm) | 14 (35.6) | 14 (35.6) | 14.1 (35.6) | 14.3 (36.3) |

TABLE 5B

Measured Properties for Films 5-8

| Sample ID | 5 | 6 | 7 | 8 |
|---|---|---|---|---|
| Gauge Mic (mils) | | | | |
| Average | 1.01 | 1.02 | 1 | 1.01 |
| Low | 0.94 | 0.94 | 0.97 | 0.89 |
| High | 1.07 | 1.14 | 1.05 | 1.12 |
| 1% Flex Mod (psi) | | | | |
| MD | 25,493 | 27,765 | 25,442 | 28,249 |
| TD | 33,049 | 31,956 | 28,599 | 33,041 |
| Tensile Yield Strength (psi) | | | | |
| MD | 1,431 | 1,432 | 1,313 | 1,392 |
| TD | 1,365 | 1,389 | 1,394 | 1,442 |
| Elongation @ Yield (%) | | | | |
| MD | 6.9 | 6.6 | 5.9 | 6.1 |
| TD | 4.4 | 4.7 | 6 | 5.5 |
| Tensile Strength (psi) | | | | |
| MD | 9,786 | 8,892 | 9,245 | 8,978 |
| TD | 8,411 | 8,407 | 7,875 | 7,588 |
| Elongation @ Break (%) | | | | |
| MD | 568 | 557 | 519 | 520 |
| TD | 639 | 670 | 604 | 646 |

TABLE 5C

Measured Properties for Films 5-8

| Sample ID | 5 | 6 | 7 | 8 |
|---|---|---|---|---|
| Elmendorf Tear | | | | |
| MD (g) | 201 | 200 | 216 | 201 |
| TD (g) | 403 | 495 | 386 | 481 |
| MD (g/mil) | 203 | 204 | 219 | 197 |
| TD (g/mil) | 412 | 495 | 393 | 471 |
| Haze (%) | 2.6 | 3.6 | 2.4 | 3.3 |
| Gloss (GU) | | | | |
| MD | 81 | 79 | 83 | 77 |
| TD | 82 | 79 | 84 | 77 |
| Dart Impact, Composite Method A | | | | |
| (g) | 533 | 383 | 677 | 587 |
| (g/mil) | 528 | 375 | 677 | 581 |
| Puncture, BTEC Method B | | | | |
| Peak Force (lbs) | 12.9 | 12.2 | 11.9 | 11.9 |
| Peak Force (lbs/mil) | 12.8 | 12 | 11.9 | 11.8 |
| Break Energy (in-lbs) | 44.4 | 38.1 | 34.5 | 36 |
| Break Energy (in-lbs/mil) | 44 | 37.3 | 34.5 | 35.6 |

TABLE 6A

Process Results for Films 9-10

| Process Parameter | Units | 9 | 10 |
|---|---|---|---|
| Gauge (measured by lab) | mil | 1.02 | 1.06 |
| Gauge 2σ | % | 2.8 | 10.0 |
| BUR | | 2.5 | 2.5 |
| Lay Flat | in | 24.68 | 24.97 |
| Total Extrusion Rate | lbs/hr | 198.1 | 454.1 |
| Maximum Die Rate | lb/hr/in-circumference (kg/mm-hr) | 10 (0.56) | 23 (1.30) |
| Frost Line Height | in | 34 | 70 |
| Line Speed (primary nip) | FPM | 162.1 | 371.4 |
| Extruder Speed | RPM | 31.8 | 74.6 |
| Extruder Load | % | 55.47 | 61.72 |
| Specific Output | lb/hr/rpm | 6.23 | 6.08 |
| Air Ring Height | in (cm) | 14.3 (36.3) | 14.3 (36.3) |

TABLE 6B

Measured Properties for Films 9-10

| Sample ID | 9 | 10 |
|---|---|---|
| Gauge Mic (mils) | | |
| Average | 1.01 | 1.07 |
| Low | 0.95 | 0.97 |
| High | 1.1 | 1.19 |

TABLE 6B-continued

Measured Properties for Films 9-10

| Sample ID | 9 | 10 |
|---|---|---|
| 1% Flex Mod (psi) | | |
| MD | 25,288 | 26,525 |
| TD | 32,578 | 33,076 |
| Tensile Yield Strength (psi) | | |
| MD | 1,347 | 1,409 |
| TD | 1,315 | 1,544 |
| Elongation @ Yield (%) | | |
| MD | 7.1 | 6.5 |
| TD | 4.2 | 7.8 |
| Tensile Strength (psi) | | |
| MD | 8,654 | 8,727 |
| TD | 8,030 | 8,192 |
| Elongation @ Break (%) | | |
| MD | 563 | 543 |
| TD | 606 | 650 |

TABLE 6C

Measured Properties for Films 9-10

| Sample ID | 9 | 10 |
|---|---|---|
| Elmendorf Tear | | |
| MD (g) | 212 | 234 |
| TD (g) | 392 | 548 |
| MD (g/mil) | 210 | 232 |
| TD (g/mil) | 396 | 503 |
| Haze (%) | 2.8 | 3.8 |
| Gloss (%) | | |
| MD | 82 | 77 |
| TD | 82 | 78 |
| Dart Impact, Composite Method A | | |
| (g) | 742 | 652 |
| (g/mil) | 734 | 609 |
| Puncture, BTEC Method B | | |
| Peak Force (lbs) | 10.9 | 12.5 |
| Peak Force (lbs/mil) | 10.8 | 11.7 |
| Break Energy (in-lbs) | 30.4 | 41.2 |
| Break Energy (in-lbs/mil) | 30.1 | 38.5 |

The phrase "consisting essentially of" in a film means that no other additives (additional polymers and/or antioxidants, antistatic agents, antislip agents, fillers) are present in the composition being referred to other than those named, or, if present, are present to a level no greater than 0.5, or 1.0, or 2.0, or 4.0 wt % by weight of the composition; and in a process, "consisting essentially of" means that no other major process step is present or effects the claimed film properties such that the value would be outside the claim scope.

For all jurisdictions in which the doctrine of "incorporation by reference" applies, all of the test methods, patent publications, patents and reference articles are hereby incorporated by reference either in their entirety or for the relevant portion for which they are referenced, including the priority document(s).

We claim:

1. A polyethylene composition comprising the product of the combination of:
   a) at least one copolymer comprising units derived from at least 85 wt % ethylene and a $C_3$ to $C_{10}$ α-olefin, the at least one copolymer having a density from 0.905 g/cm$^3$ to 0.930 g/cm$^3$ and a melt index ($I_{2.16}$) from 0.20 g/10 min to 10.0 g/10 min; and
   b) from 0.10 wt % to 10 wt % of a cyclic-diene terpolymer (CDTP), by weight of the composition; the CDTP comprising units derived from 0.01 wt % to 10.0 wt % cyclic-diene units, from 0.01 wt % to 20 wt % of $C_3$ to $C_{10}$ α-olefin units, and ethylene units;

wherein the at least one copolymer has a $g'_{vis}$ of greater than 0.90.

2. The polyethylene composition of claim 1, wherein the polyethylene composition comprises from 0.10 wt % to 5.0 wt % of the CDTP.

3. The polyethylene composition of claim 1, wherein the polyethylene composition comprises from 0.10 wt % to 4.0 wt % of the CDTP.

4. The polyethylene composition of claim 1, wherein the polyethylene composition comprises from 0.50 wt % to 3.0 wt % of the CDTP.

5. The polyethylene composition of claim 1, wherein the cyclic-diene derived units are selected from the group consisting of dicyclopentadiene (DCPD), norbornadiene (NBD), 5-vinyl-2-norbornene (VNB), ethylidene norbornene (ENB), derivatives thereof, and combinations thereof.

6. The polyethylene composition of claim 1, wherein the cyclic-diene derived units are derived from 5-vinyl-2-norbornene (VNB).

7. The polyethylene composition of claim 1, wherein the $C_3$ to $C_{10}$ α-olefin units are selected from the group consisting of propylene, 1-butene, 1-hexene, and 1-octene.

8. The polyethylene composition of claim 1, wherein the CDTP comprises from 70 wt % to 98 wt % ethylene derived units.

9. The polyethylene composition of claim 1, wherein the CDTP comprises from 80 wt % to 98 wt % ethylene derived units.

10. The polyethylene composition of claim 1, wherein the CDTP comprises from 0.10 wt % to 5.0 wt % cyclic-diene units.

11. The polyethylene composition of claim 1, wherein the CDTP comprises from 0.50 wt % to 5.0 wt % cyclic-diene units.

12. The polyethylene composition of claim 1, wherein the CDTP has one or more of the following features:
   (1) a $g'_{vis}$ of less than 0.80;
   (2) an $M_{n(DRI)}$ from 18,000 g/mol to 80,000 g/mol;
   (3) an $M_{w(MALLS)}$ from 200,000 g/mol to 1,000,000 g/mol;
   (4) an $M_{z(MALLS)}$ from 900,000 g/mol to 3,400,000 g/mol;
   (5) an $M_{w(MALLS)}/M_{n(DRI)}$ from 5.0 to 30.0;
   (6) an $M_{z(MALLS)}/M_{w(MALLS)}$ from 2.0 to 14.0; and
   (7) an $M_{z(MALLS)}/M_{n(DRI)}$ from 50.0 to 140.

13. The polyethylene composition of claim 12, wherein the CDTP has two or more features of (1)-(7).

14. The polyethylene composition of claim 12, wherein the CDTP has three or more features of (1)-(7).

15. The polyethylene composition of claim 12, wherein the CDTP has all of the features of (1)-(7).

16. The polyethylene composition of claim 1, wherein the at least one copolymer has a melt index ($I_{2.16}$) from 0.40 g/10 min to 8.0 g/10 min.

17. The polyethylene composition of claim 1, wherein the at least one copolymer has a melt index ($I_{2.16}$) from 0.60 g/10 min to 5.0 g/10 min.

18. The polyethylene composition of claim 1, wherein the at least one copolymer has a density from 0.910 g/cm$^3$ to 0.925 g/cm$^3$.

19. The polyethylene composition of claim 1, wherein the at least one copolymer has a melting point temperature of about 118° C.

20. A polyethylene composition comprising the product of the combination of:
 a) at least one copolymer comprising units derived from at least 85 wt % ethylene and a $C_3$ to $C_{10}$ α-olefin, the at least one copolymer having a density from 0.905 g/cm$^3$ to 0.930 g/cm$^3$ and a melt index ($I_{2.16}$) from 0.20 g/10 min to 10.0 g/10 min; and
 b) from 0.10 wt % to 10 wt % of a cyclic-diene terpolymer (CDTP), by weight of the composition; the CDTP comprising units derived from 0.01 wt % to 10.0 wt % cyclic-diene units, from 0.01 wt % to 20 wt % of $C_3$ to $C_{10}$ α-olefin units, and ethylene units;
 wherein the at least one copolymer has a molecular weight distribution ($M_w/M_n$) from 1.8 to 4.0.

21. A polyethylene composition comprising the product of the combination of:
 a) at least one copolymer comprising units derived from at least 85 wt % ethylene and a $C_3$ to $C_{10}$ α-olefin, the at least one copolymer having a density from 0.905 g/cm$^3$ to 0.930 g/cm$^3$ and a melt index ($I_{2.16}$) from 0.20 g/10 min to 10.0 g/10 min; and
 b) from 0.10 wt % to 10 wt % of a cyclic-diene terpolymer (CDTP), by weight of the composition; the CDTP comprising units derived from 0.01 wt % to 10.0 wt % cyclic-diene units, from 0.01 wt % to 20 wt % of $C_3$ to $C_{10}$ α-olefin units, and ethylene units;
 wherein the at least one copolymer has a SHR (150° C.) from 1.0 to 3.0 per 1 wt % of CDTP present in the polyethylene composition.

* * * * *